April 17, 1928.
H. WOODHEAD ET AL
1,666,278
HOLLOW BRACING UNIT
Filed July 28, 1926
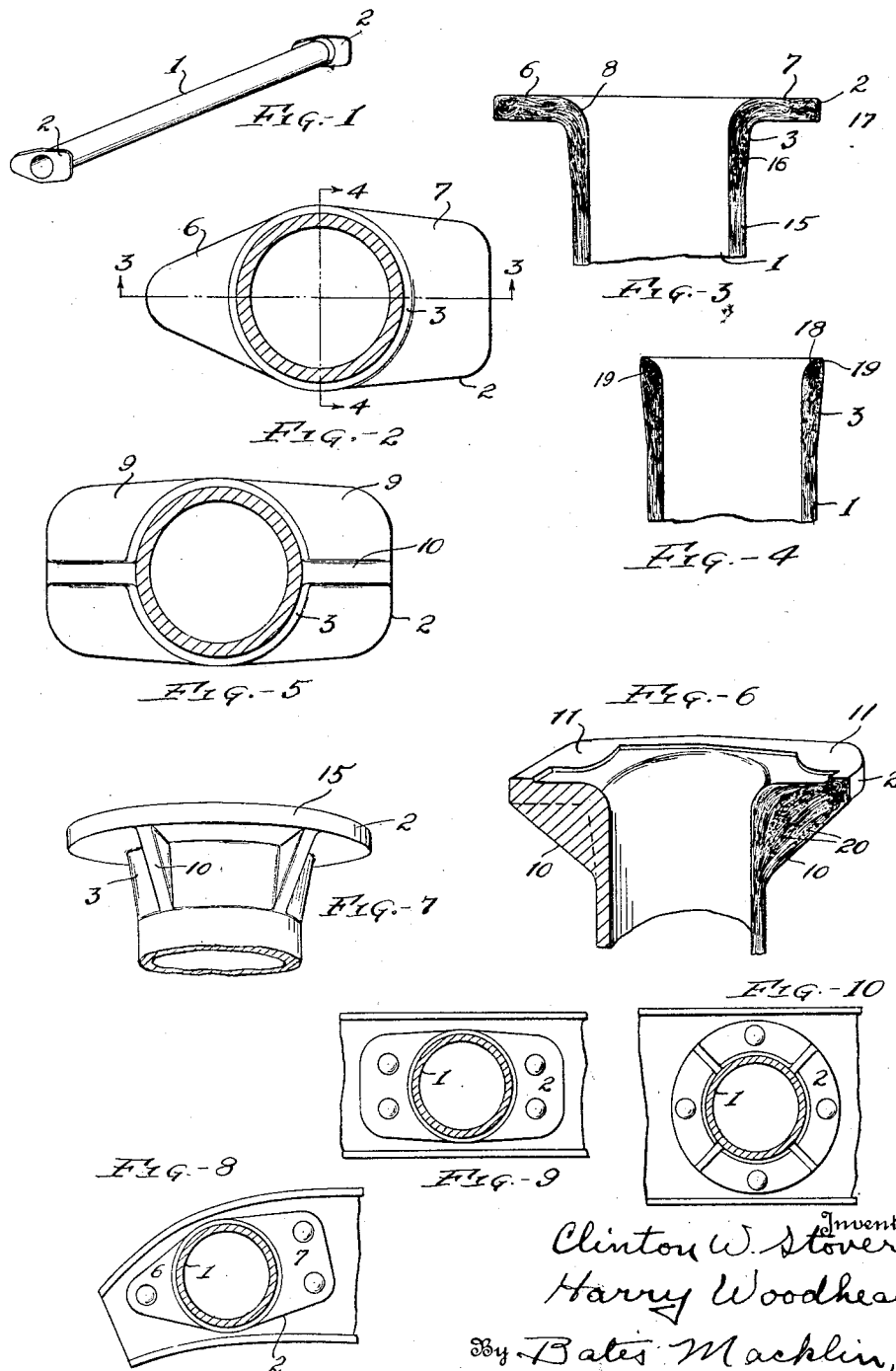

Patented Apr. 17, 1928.

1,666,278

UNITED STATES PATENT OFFICE.

HARRY WOODHEAD AND CLINTON W. STOVER, OF CLEVELAND, OHIO.

HOLLOW BRACING UNIT.

Application filed July 28, 1926. Serial No. 125,395.

The object of this invention is to provide a bracketed tubular member such as a cross frame bracing member for an automobile frame, consisting of a steel tube having integrally formed forged flanges or brackets at one or both ends. A further object is to provide flanges of forged metal materially greater in extent than the tube and which may be thicker than the wall of the tube and of considerably greater strength for a given amount of metal. Still more specifically it is an object to provide such forged flanges which will be connected with the tube by a reinforcing taper, or which may be connected by reinforcing radially extending webs with or without the taper.

The process of forming such a bracket on the ends of a steel tube preferably seamless is set forth in our application having S. N. 125,396, filed on even date herewith. The article as formed by our process and in which the metal is caused to flow under great compression into a laterally extending flange, results in an exceedingly strengthened flanged portion having very strong grain characteristics as distinguished from that resulting from merely changing the shape of a tube, by splitting and bending or the like, of a tube, to form flanges, but without forging the metal.

Further advantages and features of our invention will become apparent from the description to follow, which relates to the accompanying drawing. The essential characteristics are summarized in the claims.

In the drawing Fig. 1 is a perspective view of a bracketed cross frame brace made in accordance with our invention; Fig. 2 is an end elevation of the bracket portion; Fig. 3 is a fragmentary cross section showing the grain characteristics of the metal forming the bracket portion; Fig. 4 is a similar fragmentary cross sectional view taken at right angles to Fig. 3; Fig. 5 is a rear end elevation of one form of the flanged article; Fig. 6 is a sectional perspective view showing machine pads on the outer face of the bracket portion; Fig. 7 is a fragmentary perspective view of one end of a brace showing an annular flange; Figs. 8, 9 and 10 show various types of flanges as adapted for use on different portions of a frame or on different frames.

Referring in detail to the drawing, 1 indicates the central tubular portion of a cross frame member which as above mentioned consists of a section of drawn steel tubing which may be either seamless tubing or seam weld tubing and 2 indicates the forged brackets at either end thereof as shown particularly in Fig. 3. To provide for additional stiffness the metal starts to thicken as at 5 substantially below the bracket portions 6 and 7 and merges with these brackets in a curve as at 8.

By reason of our process, above referred to, the metal in both the flange portions and thickened portion is highly compressed metal, much stronger than the tube itself. Since the flanges are formed by simply compressing the upset tube outwardly and constraining the flange metal to flow into a restricting recess having the desired contour of the flanges, the grain though irregular as shown in Fig. 3 is at the same time very compact and does not have a tendency to split apart even at the outer edges of such flanges. We may provide webs for additional bracing such as shown at 10 connecting the tapered reinforcing portion with the flanges, the webs being integral and forged with such flanges and reinforced metal. In Fig. 6 we show the flanges as provided with machine pads 11 connected by raised ribs 12, these being formed in our process by irregularities in the dies.

The grain characteristics of the metal throughout our article is illustrated in Figs. 3, 4 and 6. In Fig. 3 it will be seen that the grain of the metal is substantially straight and parallel at 15, this being the grain of the original tube. In the tapered portion 3, the grain indicated at 4 becomes more irregular and is, as a matter of fact, much more compact by reason of being upset in the first operation of our process, which operation consists in shortening and thickening the end of the tube. The grain lines follow in undulating paths along the flange and in some cases crossing at an angle. At the extreme edge of the flange, the grains turn on themselves, in some cases, resulting in a cross binding grain. These cross grains are indicated at 17 and appear as little dots when a cross section of the actual flange is etched. The laterally running grains double upon themselves in some cases and all in all result in an extremely strengthened body of metal, by reason of being twice forged and highly compressed.

As shown in Fig. 4, the grains are exceedingly compact at the very edge of the tube, from which the flanges start, the cross grains being indicated at 18, the folded longitudinally running grains appearing at 19. The reason for this particular point having extra strength will be more apparent by reference to our process which shows that the tube at this point gets an additional squeezing over that of the flanges.

In Fig. 6 it will be seen that the webs are greatly strengthened by reason of the grains bridging across from the tapered portion to the flanges and running longitudinally through the webs. There will of course, be loops extending into the webs from the adjacent flange and taper serving in the effect as anchors for the webs. Such cross loops appear as little dots at 20 scattered throughout the web and intermingling with the longitudinally running grains.

Although our preferred bracket has separate flange members such as 6, 7 or 9, we may if desired, form the brace as shown in Fig. 7, wherein the bracket portion is simply an annular flange 15, integrally connected by tapering thickened forged metal with the tube, as before.

Fig. 8 illustrates the application of the brace as shown in Fig. 2 to the front frame members of an automobile wherein it is desirable to have one of the flanges fairly narrow while the other may be wider to supply additional strength and to provide additional room for bolts. Figs. 9 and 11 show the braces in the form illustrated in Figs. 6 and 7 applied to the flanged sections of similar frames.

From the foregoing description it will be seen that we have provided an article for the purposes set forth, which may comprise bracketed end members formed on a section of steel tubing and may provide reinforcing webs of any desired shape and number, and in which the metal grain characteristics are such as to attain great strength and durability. Obviously such an article, with or without further adaptation, has many uses other than that specifically designated, hence it is to be understood that we do not wish to be limited, in employing our invention, either in the matter of use or shape.

We claim:

1. A tubular bracketed frame brace consisting of a section of drawn steel tubing upset at its end to provide a thickened tapered portion, flanges extending integrally therewith and outwardly from the thickened portion at an angle, the metal of the flanges being highly compressed and the metal at the edge of the thickened portion between the flanges being stronger than the metal of both the flanges and tube.

2. A tubular bracketed frame brace consisting of a section of drawn steel tubing upset at its end to provide a thickened portion, flanges extending outwardly therefrom and integral therewith, said flanges being twice forged and of highly compressed metal, the side edge regions of the bases or tube joining portions of the flanges having greater strength per unit area than the major portions of such flanges.

3. An article for the purpose described consisting of a section of drawn steel tubing having at its end a thickened tapering portion of forged metal, forged flanges extending outwardly therefrom and integral therewith and boss portions rising at intervals along the outward faces of said flanges to form machine pads.

4. A tubular frame or brace member consisting of a hollow shank portion and a hollow thickened head, there being a flange extending laterally from the head, integrally joined thereto and of highly compressed forged metal, the metal of the head adjacent the side edges of the flange being more highly compressed than the metal of the major portion of the flange.

In testimony whereof, we hereunto affix our signatures.

C. W. STOVER.
HARRY WOODHEAD.